US006934712B2

(12) United States Patent
Kiernan et al.

(10) Patent No.: US 6,934,712 B2
(45) Date of Patent: Aug. 23, 2005

(54) TAGGING XML QUERY RESULTS OVER RELATIONAL DBMSS

(75) Inventors: Gerald George Kiernan, San Jose, CA (US); Jayavel Shanmugasundaram, San Jose, CA (US); Eugene Jon Shekita, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 09/810,167

(22) Filed: Mar. 19, 2001

(65) Prior Publication Data

US 2001/0037345 A1 Nov. 1, 2001

Related U.S. Application Data

(63) Continuation-in-part of application No. 09/531,802, filed on Mar. 21, 2000.

(51) Int. Cl.$^7$ .......................................... G06F 17/30
(52) U.S. Cl. ........................... 707/102; 707/2; 707/3; 707/4; 707/5; 715/513; 715/514
(58) Field of Search ............................. 707/1, 2, 3, 4, 707/5, 100, 102; 715/513, 514

(56) References Cited

U.S. PATENT DOCUMENTS 6,263,332 B1 * 7/2001 Nasr et al. ..................... 707/5
6,519,597 B1 * 2/2003 Cheng et al. ................. 707/10
6,604,100 B1 * 8/2003 Fernandez et al. ............. 707/3

FOREIGN PATENT DOCUMENTS

EP        1225516 A1 *  1/2001   ........... G06F/17/30

OTHER PUBLICATIONS

Jayael Shanmugasundaram, Relational Databases for Querying XML Documents: Limitations and Opportunities, Proceedings o the 25$^{th}$ VLDB Conference, Edinburgh, Scotland, 1999.*

J. Shanmugasundaram et al., "*Efficiently Publishing Relational Data as XML Documents,*" IBM Almaden Research Center.

* cited by examiner

*Primary Examiner*—Shahid Alam
*Assistant Examiner*—Hung Pham
(74) *Attorney, Agent, or Firm*—Randy W. Lacasse; Lacasse & Associates; Ramraj Soundararajan

(57) ABSTRACT

A method for publishing relational data as XML by translating XML queries into queries against a relational database. Conversion of the relational database into an XML database is not required. Each relational table is mapped to a virtual XML document, and XML queries are issued over these virtual documents. An XML query is parsed and transformed into a language-neutral intermediate representation, which is a sequence of operations describing how the output document is derived from the underlying relational tables. The intermediate representation is then translated into an SQL query over the underlying relational tables. The intermediate representation is also used to generate a tagger graph, which the tagger runtime 'walks' to generate the tagged, structured XML output. Each of the nodes of the tagger graph are operators which perform processing on the results of the SQL query. The SQL query is executed, and the SQL query results are then provided to the tagger. The tagger runtime applies the operators of each node to the inputs at that node to produce the structured XML document as a query result, guided by the structure of the tagger graph.

45 Claims, 20 Drawing Sheets

DEPT TABLE —— 300

| DNO | NAME | SIZE |
|---|---|---|
| 1 | Finance | 100 |
| 2 | Marketing | 200 |
| 3 | Sales | 50 |
| ... | | |

Figure 3

EMP TABLE —— 310

| DNO | ENO | NAME | AGE |
|---|---|---|---|
| 1 | 1 | J. Skolem | 50 |
| 2 | 2 | L. Hubbard | 33 |
| ... | | | |

Default XML View of the DEPT Table —— 320

```
<DEPT>
  <ROW>
    <DNO>1</DNO><NAME>Finance</NAME><SIZE>100</SIZE>
  </ROW>
  <ROW>
    <DNO>2</DNO><NAME>Marketing</NAME><SIZE>200</SIZE>
  </ROW>
  <ROW>
    <DNO>3</DNO><NAME>Sales</NAME><SIZE>50</SIZE>
  </ROW>
  ...
</DEPT>
```

Default XML View of the EMP Table —— 330

```
<EMP>
  <ROW>
    <DNO>1</DNO><ENO>1</ENO><NAME>J. Skolem</NAME><AGE>50</AGE>
  </ROW>
  <ROW>
    <DNO>2</DNO><ENO>2</ENO><NAME>L. Hubbard</NAME><AGE>33</AGE>
  </ROW>
  ...
</EMP>
```

Query Over the Default View

```
WHERE
  <DEPT>
    <ROW>
      <DNO>$DNO</DNO><NAME>$DNAME</NAME>
      <SIZE>$DSIZE</SIZE>
    </ROW>
  </DEPT>IN DefaultView,
  $DSIZE>75
CONSTRUCT
  <BIGDEPT>
    <NAME>$DNAME</NAME>
    <SIZE>$DSIZE</SIZE>
    {WHERE
      <EMP>
        <ROW><DNO>$DNO</DNO><NAME>$ENAME</NAME></ROW>
      </EMP>IN DefaultView
    CONSTRUCT
      <EMP><NAME>$ENAME</NAME></EMP>}
  </BIGDEPT>
```

XML Produced by the Query

```
<BIGDEPT>
  <NAME>Finance</NAME>
  <SIZE>100</SIZE>
  <EMP><NAME>J.Skolem</NAME></EMP>
  ...
</BIGDEPT>
<BIGDEPT>
  <NAME>Marketing</NAME>
  <SIZE>200</SIZE>
  <EMP><NAME>L. Hubbard</NAME></EMP>
  ...
</BIGDEPT>
...
```

Figure 4

Employee

| WORKDEPT | ENO | LASTNAME |
|---|---|---|
| 1 | 1 | Haas |
| 2 | 2 | Thompson |
| 3 | 3 | Kwan |
| 1 | 4 | Lucchessi |
| 1 | 5 | O'Connell |
| 3 | 6 | Quintana |
| 3 | 7 | Nicholls |

Figure 9a

Default XML View of the Employee Table (DefaultEmployee)

```
<EMP>
 <ROW>
    <WORKDEPT>1</WORKDEPT><ENO>1</ENO><LASTNAME>Haas</LASTNAME>
 </ROW>
 <ROW>
    <WORKDEPT>2</WORKDEPT><ENO>2</ENO><LASTNAME>Thompson</LASTNAME>
 </ROW>
 <ROW>
    <WORKDEPT>3</WORKDEPT><ENO>3</ENO><LASTNAME>Kwan</LASTNAME>
 </ROW>
 <ROW>
    <WORKDEPT>1</WORKDEPT><ENO>4</ENO><LASTNAME>Lucchessi</LASTNAME>
 </ROW>
 <ROW>
    <WORKDEPT>1</WORKDEPT><ENO>5</ENO><LASTNAME>O'Connell</LASTNAME>
 </ROW>
 <ROW>
    <WORKDEPT>3</WORKDEPT><ENO>6</ENO><LASTNAME>Quintana</LASTNAME>
 </ROW>
 <ROW>
    <WORKDEPT>3</WORKDEPT><ENO>7</ENO><LASTNAME>Nicholls</LASTNAME>
 </ROW>
</EMP>
```

Figure 9b

Department

| DEPTNO | DEPTNAME | SIZE |
|---|---|---|
| 1 | Spiffy Computer | 3 |
| 2 | Planning | 1 |
| 3 | Information Center | 3 |
| 4 | Development Center | 0 |

Figure 10a

Default XML View of the Department Table (DefaultDepartment)

```
<DEPT>
    <ROW>
        <DEPTNO>1</DEPTNO><DEPTNAME>Spiffy Computer </DEPTNAME><SIZE>3</SIZE>
    </ROW>
    <ROW>
        <DEPTNO>2</DEPTNO><DEPTNAME>Planning</DEPTNAME><SIZE>1</SIZE>
    </ROW>
    <ROW>
        <DEPTNO>3</DEPTNO><DEPTNAME>Information
Center</DEPTNAME><SIZE>3</SIZE>
    </ROW>
    <ROW>
        <DEPTNO>4</DEPTNO><DEPTNAME>Development
Center</DEPTNAME><SIZE>0</SIZE>
    </ROW>
</DEPT>
```

Figure 10b

Query Over Default Views

```
WHERE
    <DEPT>
        <ROW>
            <DEPTNO>$DEPTNO</DEPTNO> <DEPTNAME>$DEPTNAME</DEPTNAME>
            <SIZE>$SIZE</SIZE>
        </ROW>
    </DEPT> IN DefaultDepartment
CONSTRUCT
    <dept name=$DEPTNAME>
        <emplist>
        {WHERE
             <ROW>
                 <WORKDEPT>$DEPTNO</WORKDEPT><ENO>$ENO</ENO>
                 <LASTNAME>$ENAME</LASTNAME>
             </ROW>
          </EMP> IN DefaultEmployee
          CONSTRUCT
             <employee> <name> $ENAME </name> </employee>
        }
        </emplist>
    </dept>
```

Figure 11a

Result of Query

```
<dept name="SPIFFY COMPUTER">
        <emplist>
                <employee><name>HAAS</name></employee>
                <employee><name>LUCCHESSI</name></employee>
                <employee><name>O'CONNELL</name> </employee>
        </emplist>
</dept>
<dept name="PLANNING">
        <emplist>
                <employee> <name>THOMPSON</name></employee>
        </emplist>
</dept>
<dept name="INFORMATION CENTER">
        <emplist>
                <employee><name>KWAN</name></employee>
                <employee><name>QUINTANA</name></employee>
                <employee><name>NICHOLLS</name></employee>
        </emplist>
</dept>
<dept name="DEVELOPMENT CENTER">
  <emplist >
        </emplist>
</dept>
```

Figure 11b

Sorted Outer Union SQL Query

```
select q4.c2, q4.c3, q4.c4
from  (select q3.DEPTNO, q3.DEPTNAME, cast (null as VARCHAR(15)), 0        ⎫
       from DEPARTMENT AS q3                                                ⎬ 2
                                                                            ⎭
       union all
       select q2.DEPTNO, cast (null as VARCHAR(29)), q2.LASTNAME, 1         ⎫
       from  (select q1.LASTNAME, q5.DEPTNO                                 ⎪
              from  EMPLOYEE AS q1,                                         ⎪
                    DEPARTMENT AS q5                                        ⎬ 1
              where (q5.DEPTNO = q1.WORKDEPT))                              ⎪
              AS q2(LASTNAME, DEPTNO))                                      ⎪
      AS Q4(DEPTNO, DEPTNAME, LASTNAME, INDICATOR)                          ⎭
order by DEPTNO, INDICATOR
```

Figure 12a

Result of 1

| DEPTNO | 'NULL' | LASTNAME | 'INDICATOR' |
|--------|--------|----------|-------------|
| 1 | null | Haas | 1 |
| 2 | null | Thompson | 1 |
| 3 | null | Kwan | 1 |
| 1 | null | Lucchessi | 1 |
| 1 | null | O'Connell | 1 |
| 3 | null | Quintana | 1 |
| 3 | null | Nicholls | 1 |

Figure 12b

Result of 2

| DEPTNO | DEPTNAME | 'NULL' | 'INDICATOR' |
|---|---|---|---|
| 1 | Spiffy Computer | null | 0 |
| 2 | Planning | null | 0 |
| 3 | Information Center | null | 0 |
| 4 | Development Center | null | 0 |

Figure 12c

Result of Union

| DEPTNO | DEPTNAME | LASTNAME | INDICATOR |
|---|---|---|---|
| 1 | Spiffy Computer | null | 0 |
| 2 | Planning | null | 0 |
| 3 | Information Center | null | 0 |
| 4 | Development Center | null | 0 |
| 1 | null | Haas | 1 |
| 2 | null | Thompson | 1 |
| 3 | null | Kwan | 1 |
| 1 | null | Lucchessi | 1 |
| 1 | null | O'Connell | 1 |
| 3 | null | Quintana | 1 |
| 3 | null | Nicholls | 1 |

Figure 12d

Result of Order

| DEPTNO | DEPTNAME | LASTNAME | INDICATOR |
|---|---|---|---|
| 1 | Spiffy Computer | null | 0 |
| 1 | null | Haas | 1 |
| 1 | null | Lucchessi | 1 |
| 1 | null | O'Connell | 1 |
| 2 | Planning | null | 0 |
| 2 | null | Thompson | 1 |
| 3 | Information Center | null | 0 |
| 3 | null | Kwan | 1 |
| 3 | null | Quintana | 1 |
| 3 | null | Nicholls | 1 |
| 4 | Development Center | null | 0 |

Figure 12e

Result of Sorted Outer Union Query

| DEPTNAME | LASTNAME | INDICATOR |
|---|---|---|
| Spiffy Computer | null | 0 |
| null | Haas | 1 |
| null | Lucchessi | 1 |
| null | O'Connell | 1 |
| Planning | null | 0 |
| null | Thompson | 1 |
| Information Center | null | 0 |
| null | Kwan | 1 |
| null | Quintana | 1 |
| null | Nicholls | 1 |
| Development Center | null | 0 |

Figure 12f

Node Strip SQL Query

```
select q1.DEPTNO, q1.DEPTNAME  ⎫
from   DEPARTMENT AS q1        ⎬ 1
order by q1.DEPTNO             ⎭ select q2.LASTNAME, q2.DEPTNO                         ⎫
from   (select q3.LASTNAME, q4.DEPTNO                 ⎪
        from   EMPLOYEE AS q3,                        ⎪
               DEPARTMENT AS q4                       ⎬ 2
        where (q4.DEPTNO = q3.WORKDEPT))              ⎪
AS q2(LASTNAME, DEPTNO)                               ⎪
order by q2.DEPTNO                                    ⎭
```

Figure 13a

Result of Node Strip (1)

| DEPTNO | DEPTNAME |
|---|---|
| 1 | Spiffy Computer |
| 2 | Planning |
| 3 | Information Center |
| 4 | Development Center |

Figure 13b

Result of Node Strip (2)

| LASTNAME | DEPTNO |
|---|---|
| Haas | 1 |
| Lucchessi | 1 |
| O'Connell | 1 |
| Thompson | 2 |
| Kwan | 3 |
| Quintana | 3 |
| Nicholls | 3 |

Figure 13c

TAGGING XML QUERY RESULTS OVER RELATIONAL DBMSS

CROSS-REFERENCE TO RELATED APPLICATIONS

This application is a continuation-in-part of co-pending U.S. application Ser. No. 09/531,802, filed Mar. 21, 2000, entitled "USING AN XML QUERY LANGUAGE TO PUBLISH RELATIONAL DATA AS XML," incorporated herein by reference.

BACKGROUND OF THE INVENTION

1. Field of the Invention

This invention relates in general to accessing databases on a network, and more specifically, to translating eXtensible Markup Language (XML) queries into queries against a relational database for the purpose of publishing relational data as XML.

2. Description of Related Art

Computer systems incorporating Relational Database Management System (RDBMS) software using the Structured Query Language (SQL) interface are well known in the art. The SQL interface has evolved into a standard language for RDBMS software and has been adopted as such by both the American Nationals Standard Organization (ANSI) and the International Standards Organization (ISO).

In an RDBMS, all data is structured as tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies in its ability to join and relate information from multiple tables or views, and the ability to perform complex operations with a single statement.

An alternative data format to the tables found in an RDBMS is XML, which is a tag language for describing documents. XML is a restricted form of SGML, the Standard Generalized Markup Language defined in ISO 8879. XML is more fully described at the URL:

http://www.w3.org/TR/1998/REC-xml-19980210

An XML document has two parts: the marked up document, and the document schema. XML documents are made up of storage units called elements, which can be nested to form a hierarchical structure. Elements can contain either parsed or unparsed data. Parsed data is made up of characters, some of which form character data, and some of which form markup. Markup encodes a description of the document's storage layout and logical structure.

XML schemas specify constraints on the structures and types of elements in an XML document. The basic schema for XML is the DTD (Document Type Definition). Other XML schema definitions are also being developed, such as XML Schema, which is described at the URL:

http://www.w3.org/TR/1999/WD-xmlschema-1-19990924

Several query languages have been proposed for searching and reformatting XML documents. One such language is XML-QL, which is described at the URL:

http://www.w3.org/TR/NOTE-xml-ql

In XML-QL, queries have the general form:
WHERE <pattern>
IN <URLs of input documents>
CONSTRUCT <output XML>

The input documents are searched for the pattern in the WHERE part of the query. Data bindings, which are specified in the pattern, are used to construct the output XML. Note that the output XML does not have to be a well-formed document with matching start and end tags, nor does it have to conform to any DTD. Important operational features of XML-QL include:

Support for navigation in the search pattern of a query. This navigation can be expressed using path expressions.

The ability to join and relate information from multiple input documents in a single query.

Support for nested subqueries in the CONSTRUCT part of a query.

The ability to generate output XML with a different structure than the input documents.

Other XML query languages that have been proposed generally support only a subset of the above operational features. For example, the XML Query Language (XQL) does not support joins, subqueries, or the ability to generate output with a different structure than its input document. XQL is described at the URL:

http://www.w3.org/tandS/QL/QL98/pp/xql.html

XML is likely to become a future standard for information exchange between peer data stores, and between client visualization tools and data servers. Most business data will probably continue to be stored in relational database systems, however. Thus, there is a need for a mechanism to publish and query relational data as XML.

SUMMARY OF THE INVENTION

To overcome the limitations in the prior art described above, and to overcome other limitations that will become apparent upon reading and understanding the present specification, the present invention discloses a method, apparatus, and computer program product to translate XML queries into queries against a relational database to publish relational data as XML. Each relational table is mapped to a virtual XML document, and XML queries are issued over these virtual documents. An XML query is parsed and transformed into a language-neutral intermediate representation, which is a sequence of operations describing how the output document is derived from the underlying relational tables. The intermediate representation is then translated into an SQL query over the underlying relational tables and into instructions for a tagger. The SQL query is executed, and the SQL query results are then fed into the tagger, which follows its instructions to generate the marked up output.

In order to generate the marked up output, the tagger utilizes tagger instructions which are a tagger graph generated from, and which is bound to the rewritten intermediate representation of the XML query. Each of the nodes of the tagger graph are operators which perform processing on the results of the SQL query to add tags to generate the structured XML result. The tagger walks the tagger graph applying the operators of each node to the inputs at that node to produce the structured XML document as a query result, guided by the structure of the tagger graph.

BRIEF DESCRIPTION OF THE DRAWINGS

Referring now to the drawings in which like reference numbers represent corresponding parts throughout:

FIG. 3 depicts the mapping of a relational table to its Default View in XML according to the preferred embodiment of the present invention.

FIG. 4 is an exemplary XML query over the Default View and its output.

FIGS. 9a and 9b illustrate the Employee table and corresponding XML default view, respectively.

FIGS. 10a and 10b illustrate the Department table and corresponding XML default view, respectively.

FIG. 11a illustrates an exemplary XML-QL query over the default views.

FIG. 11b illustrates an exemplary output for the exemplary XML-QL query over the default views.

FIG. 12a illustrates a SQL query generated to implement the outer union method of structuring SQL result data.

FIGS. 12b–12e illustrate the intermediate results of the SQL query of FIG. 12a.

FIG. 12f illustrates the results of the SQL query of FIG. 12a.

FIG. 13a illustrates a set of SQL queries generated to implement the node strip method of structuring SQL result data.

FIGS. 13b and 13c illustrate the results of the set of SQL queries of FIG. 13a.

DETAILED DESCRIPTION OF THE PREFERRED EMBODIMENT

Overview

The preferred embodiment of the present invention describes a distributed computing architecture for use on the World Wide Web (WWW). Specifically, a server uses a relational database system as its data store. A mapping is established from each table in the database to a virtual XML document. Clients (or other servers) query these virtual documents using XML-QL. An XML-QL query is transformed into a language-neutral intermediate representation. The intermediate representation is then translated into an SQL query over the underlying relational table, and into tagging instructions. The SQL query is executed and the SQL query results are then fed into the tagger, which follows the tagging instructions to generate the marked up output from the SQL query results. The tagging instructions take the form of a tagger graph, where each node of the graph are operators which perform processing on the results of the SQL query. Each operator requests results from its inputs and evaluates a parse tree associated with the operator to tag the results and generate the output XML. The tagger runtime applies the operators of each node to the inputs at that node to produce the structured XML document as a query result, guided by the structure of the tagger graph. Those skilled in the art will recognize that another XML query language could be used in place of XML-QL without departing from the scope of the present invention.

Hardware Environment

Figure 1:
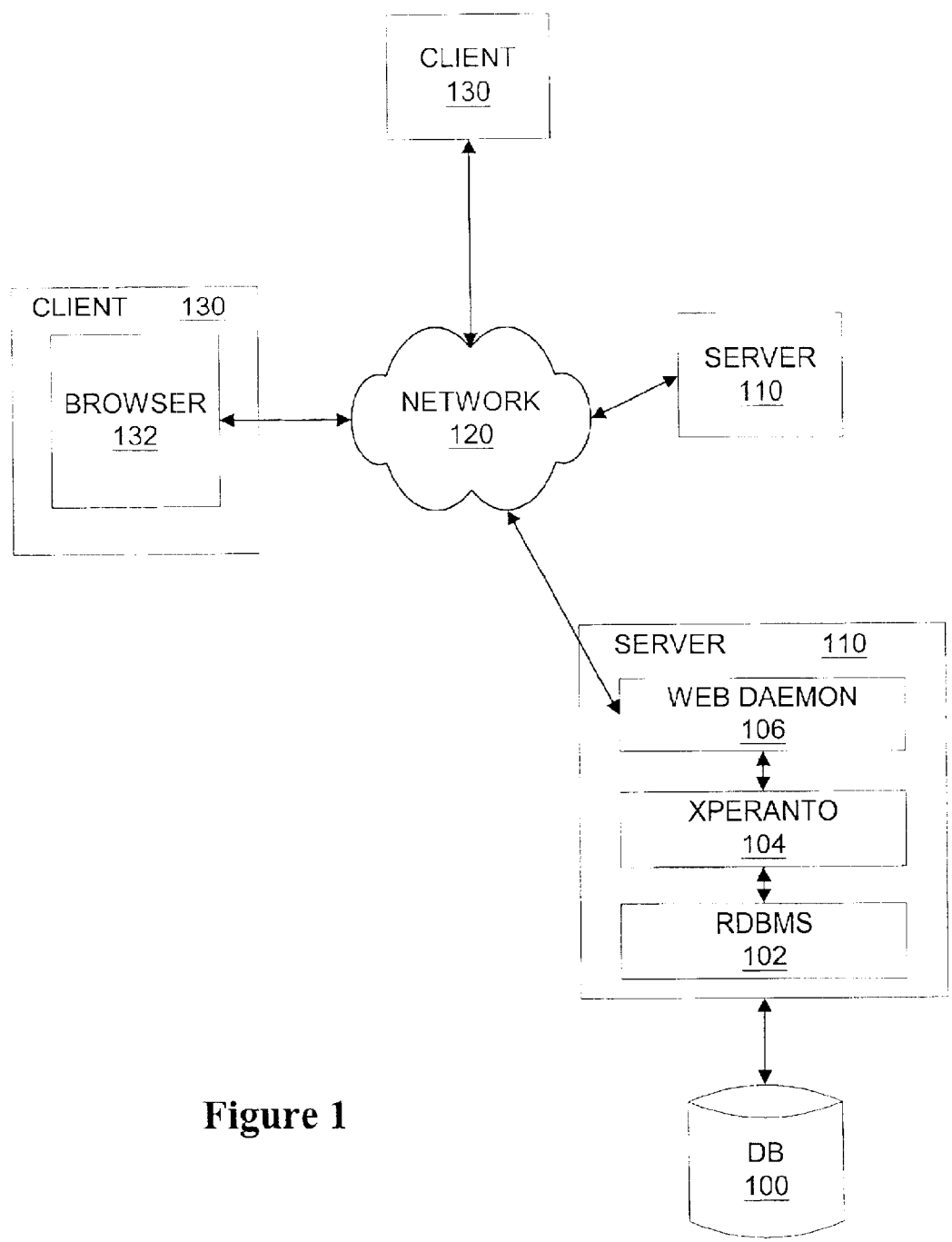
FIG. 1 is a schematic diagram of the hardware environment of the preferred embodiment of the present invention.

FIG. 1 schematically illustrates an exemplary computer hardware environment that could be used with the present invention, and more particularly, illustrates a typical distributed computing architecture using a network 120 to connect clients 130 and servers 110. Clients 130, which may include Web browsers 132, connect to servers 110, which execute server software such as Web daemons 106. Server-to-server connections may also be established using Web daemons 106. A typical combination of resources may include clients 130 that are personal computers, or workstations, and servers 110 that are personal computers, workstations, minicomputers, or mainframes. These systems may be coupled to one another over network 120, which may include other networks such as LANs, WANs, SNA networks, as well as the Internet.

The preferred embodiment of the present invention comprises a system known as Xperanto 104, which maps each table in RDBMS 102 (describing contents of a database 100) to a virtual XML document. Queries in XML-QL are issued over these virtual documents. Xperanto 104 translates an XML-QL query to an SQL query over the underlying relational tables. The SQL query is executed against RDBMS 102, and the results of the SQL query are then marked up by Xperanto 104 to form the desired output XML.

In general, Xperanto 104 comprises data and instructions which, when read, interpreted, and executed by server 110, cause server 110 to perform the steps of the present invention. Generally, the data and instructions are embodied in and readable from a device, carrier or media, such as memory, data storage devices, and remote devices coupled to server 110 via a data communications device (not shown).

However, those skilled in the art will recognize that the exemplary environment and components illustrated in FIG. 1 are not intended to limit the present invention. Indeed, those skilled in the art will recognize that other alternative hardware environments may be used without departing from the scope of the present invention. Thus, the present invention may be implemented as a method, apparatus, or article of manufacture using standard programming and engineering techniques to produce software, hardware, firmware, or any combination thereof. In addition, the term "article of manufacture" as used herein is intended to encompass logic and data embodied in or accessible from any device, carrier, or media.

Operation of the Invention

Figure 2:
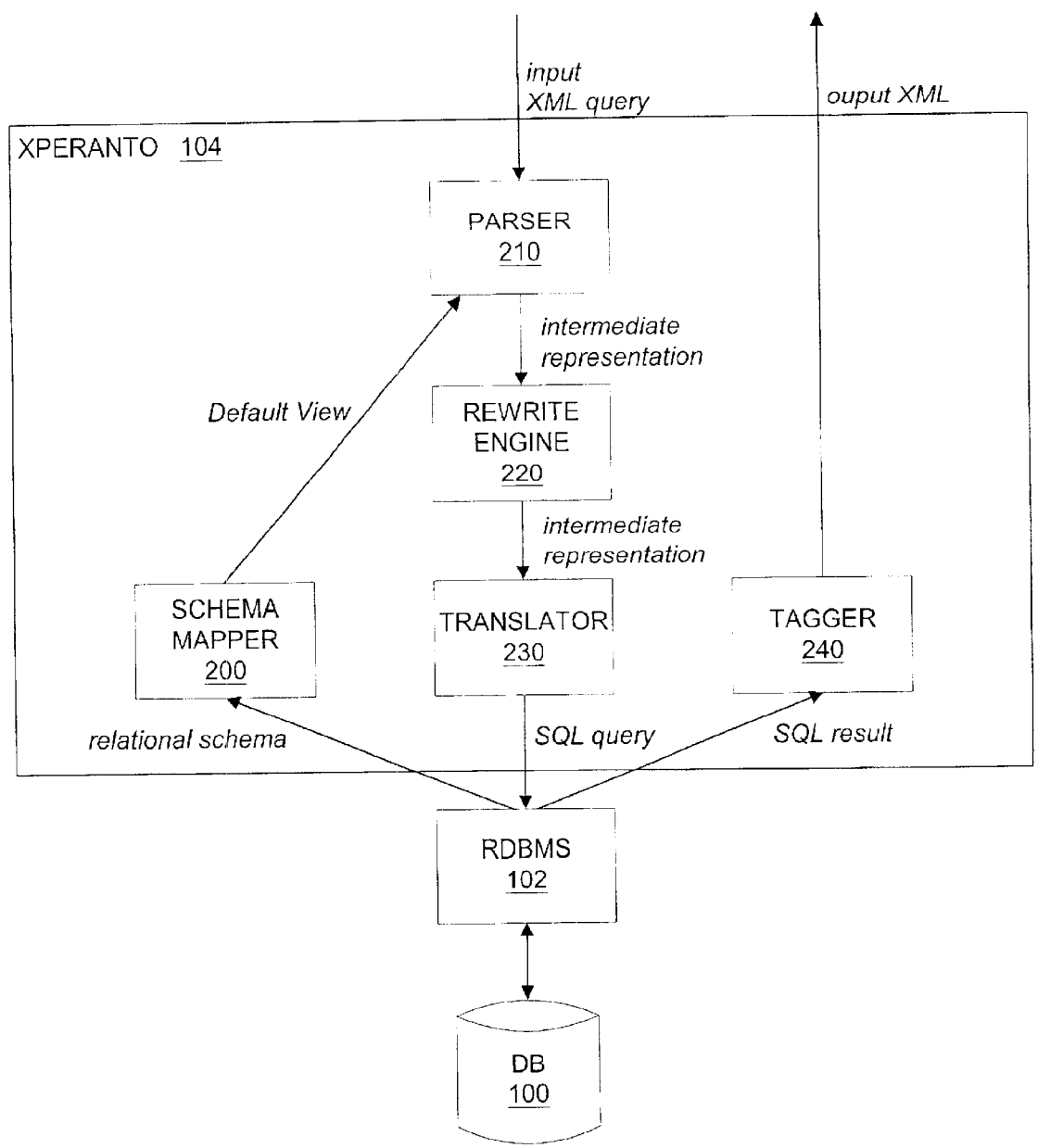
FIG. 2 is a block diagram depicting the Xperanto system of the preferred embodiment of the present invention.

FIG. 2 is a block diagram that illustrates the components of Xperanto system 104. In the preferred embodiment, Xperanto system 104 is comprised of five major components: a schema mapper 200, a parser 210, a rewrite engine 220, a translator 230, and a tagger 240.

Schema mapper 200 establishes a default XML schema (the Default View) for the data stored in RDBMS 102. Each table is mapped to a virtual XML document over which XML queries are issued. These are virtual XML documents in the sense that they are preferably never materialized. Only the results of XML queries are materialized.

Parser 210 converts an XML query to a language-neutral intermediate representation. The intermediate representation is a sequence of operations that describe how the marked up output of the XML query is derived from the underlying relational tables. It includes operations to construct new XML elements from data bindings.

Rewrite engine 220 takes the intermediate representation generated by parser and converts it to an equivalent form that may be easily translated to an SQL query.

Translator 230 translates the rewritten intermediate representation into:

(1) an SQL query over the underlying relational tables and (2) instructions for tagger 240.

Tagger instructions describe how to generate the marked up output from the SQL query results. The SQL query is executed, and the SQL query results are fed into tagger 240, which then generates marked up output according to its instructions.

Using the above components, Xperanto 104 provides the means to establish a mapping from a relational schema to an XML schema and the means to issue XML queries against that XML schema for the purpose of publishing relational data as XML. As its name implies, the Default View provides a default XML view of the relational data. In Xperanto 104, alternative views of the data may be manually defined using XML queries, since each query effectively defines a different view of the data. XML queries may then be issued over these alternative views and the Default View. Note that views may be defined on top of views by recursive application of this procedure.

The Default View

FIG. 3 provides an exemplary Default View for a department and employee database, consisting of a DEPT table 300 and an EMP table 310. The DNO and ENO columns in tables 300 and 310 uniquely identify the department number and employee number, respectively. As shown, the table name (either DEPT or EMP) is used as the tag for the outer-most XML element in the Default View. Each row in a table is mapped to a ROW element. Within a ROW element, each column of the table is mapped to an element with the column's name as its tag. Those skilled in the art will recognize that another schema mapping could be used in the Default View without departing from the scope of the present invention.

A Query Over the Default View

FIG. 4 provides an exemplary XML-QL query over the Default View of FIG. 3. The query provides the names of departments with more than 75 employees. The WHERE part of the query specifies the search criteria, namely that only departments with more then 75 employees are to be selected. It also specifies data bindings for DNO, NAME, and BUDGET. The CONSTRUCT part of the query specifies the structure of the output XML. As shown, a nested subquery appears within the CONSTRUCT. The subquery is used to nest employees with their departments. The binding for DNO is used to relate departments and employees in the subquery.

The Intermediate Representation

The intermediate representation is a sequence of parameterized operations that describe how the output of the XML-QL query is derived from the underlying relational tables. The input of each operation is one or more tables, and the output is another table. Each row of a table has a number of columns, where a column is either an atomic data value, such as an integer, or XML.

Various operations in the intermediate representation are described below. Each operation's name is given along with a list of input parameters. The list of input parameters is not necessarily exhaustive. Only key parameters are described:

BIND(X, B): This operation binds variables to data values. It produces an output table consisting of all the possible data bindings B for the input document X.

SELECT(S): This operation selects data. It applies S to each row of its input table and produces an output table consisting of rows that satisfy S.

CONSTRUCT(T, O): This operation constructs new XML elements. For each row of the input table, the data bindings in the XML template T are instantiated. The resulting XML element is assigned to column O of the output table.

JOIN(R): This operation has the same semantics as a join in an RDBMS. R is a predicate that is used to relate the two input tables.

GROUP(C, X, O): This operation groups related XML elements. The input table is grouped on column(s) C. Within a group, column X of the input table is concatenated and assigned to column O in the output. If C is empty, one group is created for the whole input table.

NEST(R, X, O): This operation nests XML elements in a parent-child relationship. It takes two input tables, with one playing the role of the parent and the other playing the role of the child. R is a predicate that used to relate a parent and child. Children are grouped with their parent. Within a group, column X of the child table is concatenated and assigned to column O in the output.

Those skilled in the art will recognize that another intermediate representation with different operations could be used without departing from the scope of the present invention. In general, operations are needed to establish the selection criteria to be applied to the input documents, the required relationships between the input documents, and the structure of the output XML.

Figure 5:
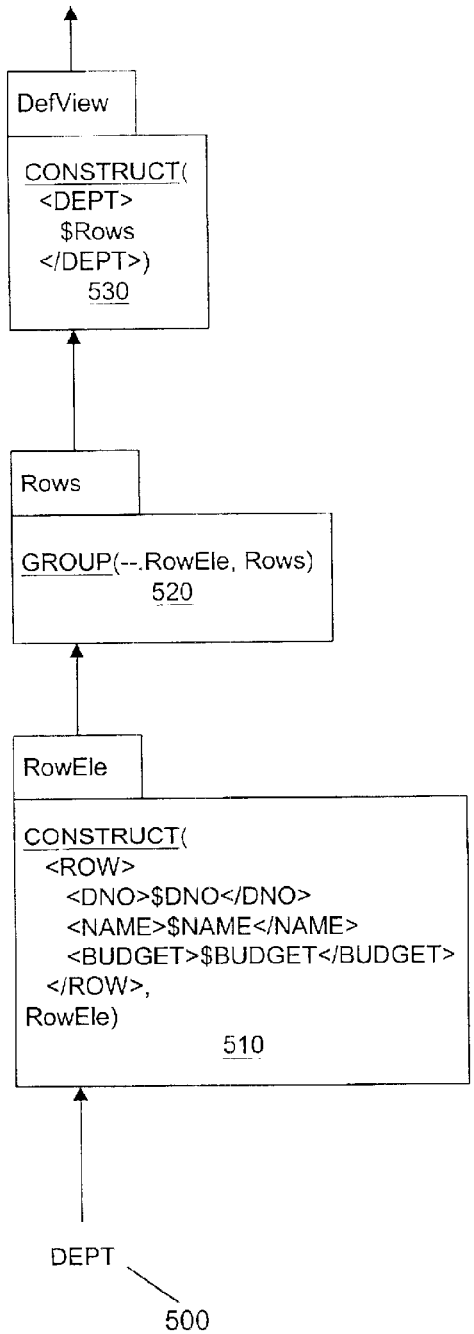
FIG. 5 illustrates the Intermediate Representation of the Default View according to the preferred embodiment of the present invention.

FIG. 5 shows the intermediate representation for the Default View of DEPT table 300 in FIG. 3. Working from the bottom up, DEPT table 300 is accessed and input to a CONSTRUCT operation 510. For each row, data bindings from the DNO, NAME, and BUDGET columns are used to construct a ROW element, which is assigned to the RowEle column. ROW elements are then concatenated by a GROUP operation 520 and assigned to the Rows column. Finally, a second CONSTRUCT operation 530 adds the DEPT tag, and the resulting XML is assigned to the DefView column. The intermediate representation for the Default View of the EMP table would look similar.

Figure 6:
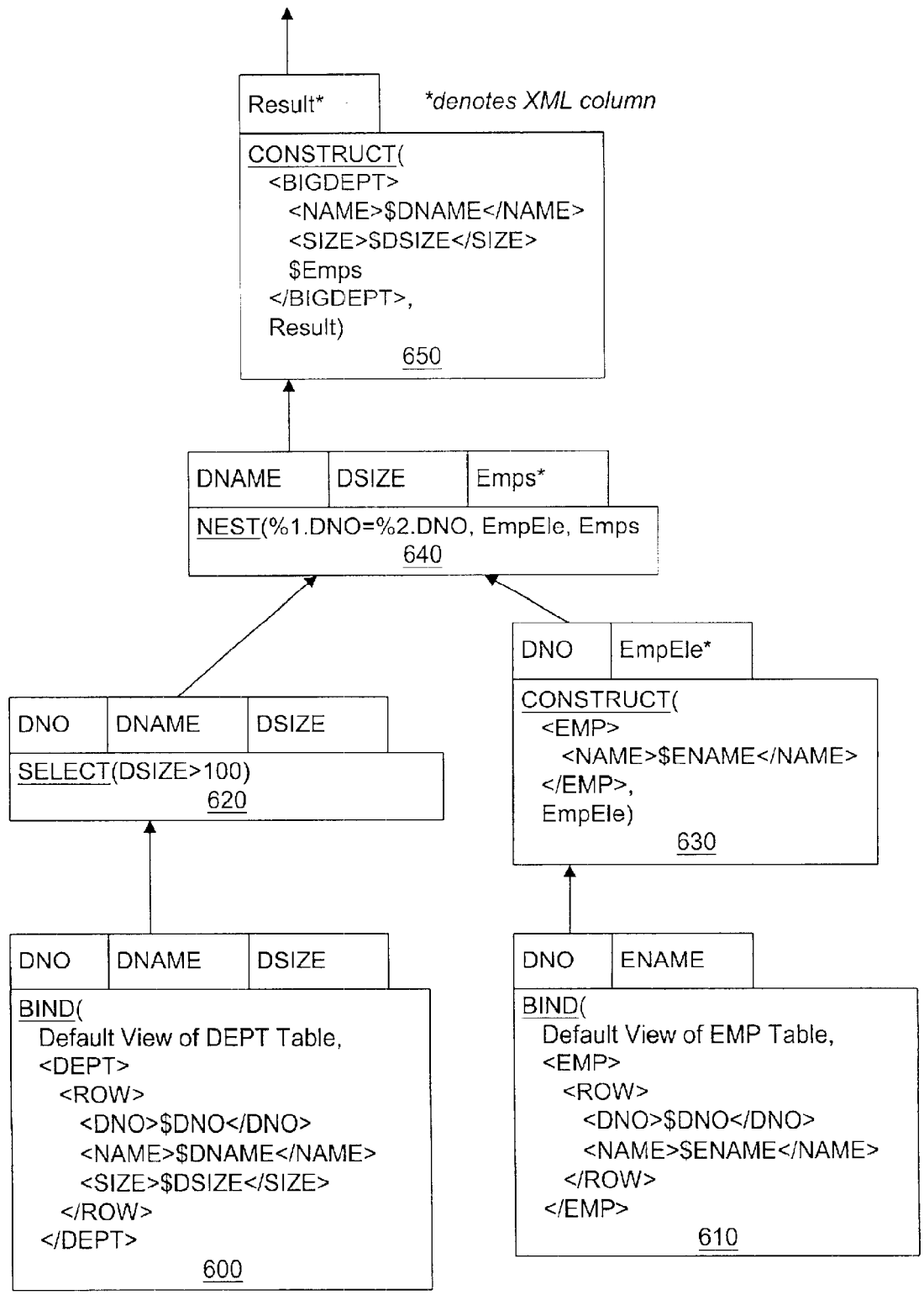
FIG. 6 illustrates the Intermediate Representation of a query over the Default View according to the preferred embodiment of the present invention.

FIG. 6 shows the intermediate representation for the query in FIG. 4. As shown, the starting point is the Default View of the DEPT and EMP tables 300 and 310. BIND operations 600 and 610 map the Default View back into a table. The marked up output is constructed by operations 630, 640, and 650. CONSTRUCT operation 630 constructs EMP elements, and NEST operation 640 groups EMP elements with the same DNO. Finally, CONSTRUCT operation 650 generates a BIGDEPT element for each department with size greater than 100, as selected by SELECT operation 620.

The Rewrite Engine

Rewrite engine 220 takes the intermediate representation generated by parser 210 and converts it to an equivalent form that may be easily translated to an SQL query. More specifically, operations to construct and group XML elements are reordered to appear last in the rewritten intermediate representation. The steps to carry out the rewrite process are as follows:

1) Let S denote the sequence of CONSTRUCT, GROUP, and CONSTRUCT operations following a table access for the Default View of a table T. Whenever S is followed by a BIND operation B, eliminate both S and B, leaving just the table access for T.

2) Let N denote a NEST operation and S denote any sequence of CONSTRUCT and GROUP operations for the child input of N. N is replaced by a JOIN operation, followed by S and a new GROUP operation G, which performs the child grouping that was previously done by N.

Figure 7:
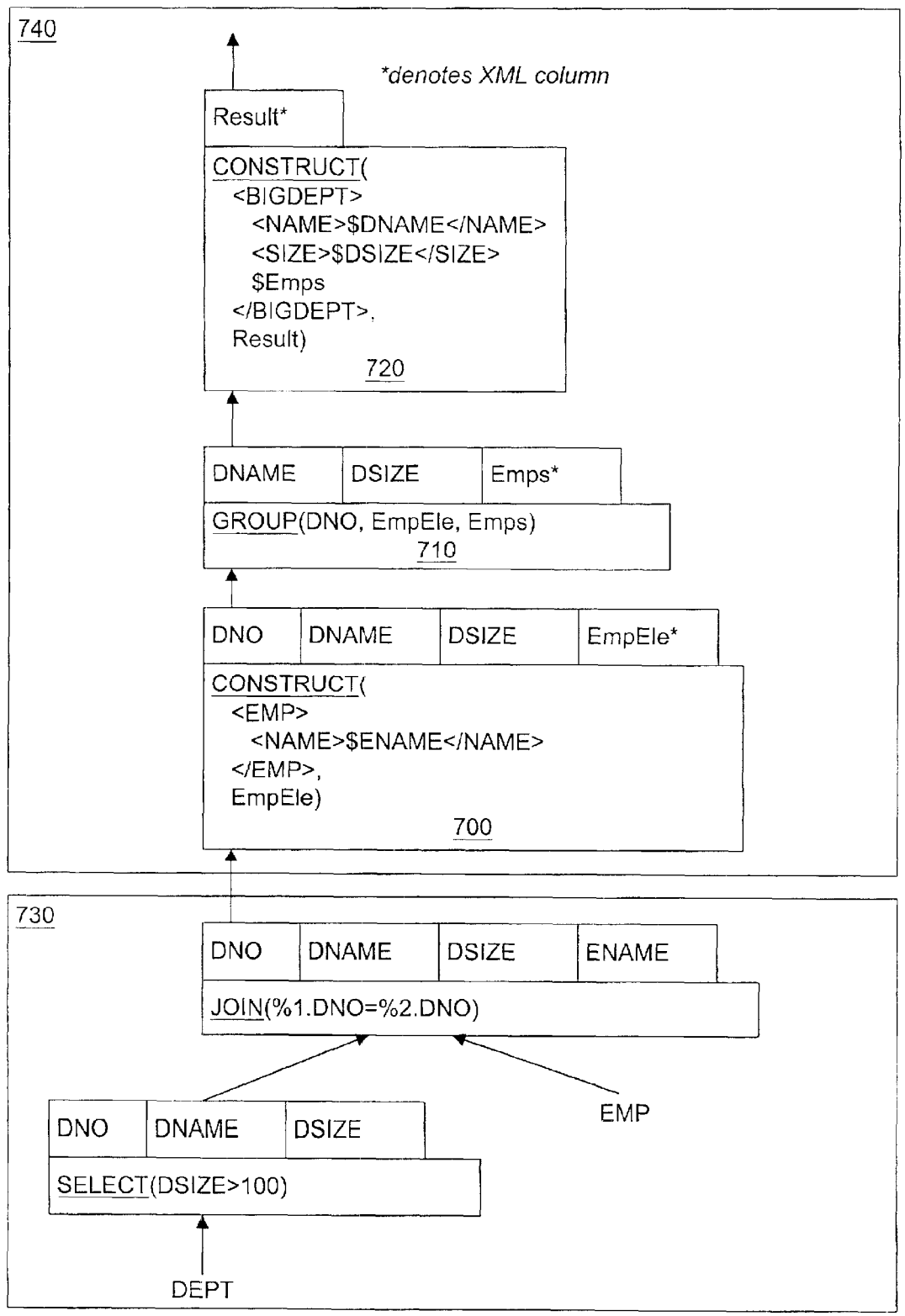
FIG. 7 illustrates the rewritten form of the Intermediate Representation according to the preferred embodiment of the present invention.

FIG. 7 shows the rewritten version of the intermediate representation in FIG. 6. As shown, the operations to construct and group XML elements now appear last. FIG. 7 is for a query with only single level of nesting. However, deeper levels of nesting can be handled by repeated application of steps 1) and 2).

Those skilled in the art will recognize that different rewrite steps could be used without departing from the scope of the present invention. In general, rewrite engine 220 converts the intermediate representation to an equivalent form where operations to generate the structure of the output XML are performed last.

Translation

Translator 230 takes the intermediate representation produced by rewrite engine 220 and translates it to: (1) an SQL query over the underlying relational tables; and (2) tagger instructions. More specifically, operations on the intermediate representation are partitioned into two groups: operations that select and relate data 730, and operations that construct and group XML elements 740. Operations that select and relate data 730 are translated into an SQL query, while operations that construct and group XML elements 740 (including CONSTRUCT operation 700, GROUP operation 710, and CONSTRUCT operation 720) are translated into tagger instructions.

Figure 8:
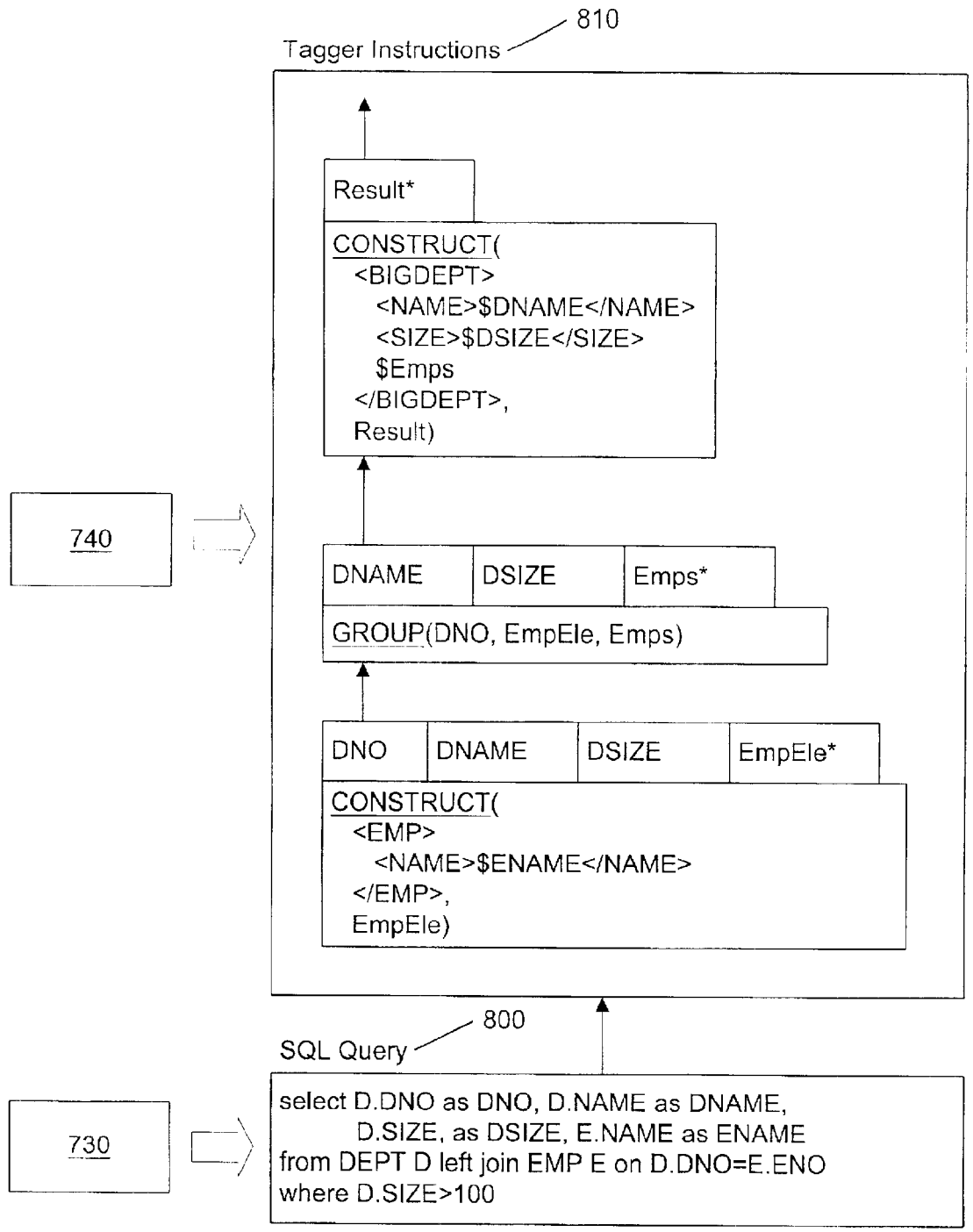
FIG. 8 illustrates the translation of the Intermediate Representation to a query over the relational database according to the preferred embodiment of the present invention.

FIG. 8 shows the translation of the intermediate representation into an SQL query 800 and tagger instructions 810. A straightforward translation from the intermediate representation into SQL query 800 is shown. Those skilled in the art will recognize that a different SQL translation could be used without departing from the scope of the present invention. Any SQL query that establishes the selection criteria and relationships among data will suffice. The intermediate representation itself is used as the tagger instructions 810. Those skilled in the art will recognize that a different instruction format could be used without departing from the scope of the present invention. Any instruction format that describes how to generate the marked up output from the results of the SQL query will suffice.

Query Execution

To produce the XML result, SQL query 800 is executed and its results are fed into tagger 240 of Xperanto 104. Tagger 240 uses tagger instructions 810 to generate the marked up output.

Tagger Operation

In order to generate the marked up output, tagger 240 utilizes tagger instructions 810 which are a tagger graph generated from, and which is bound to the rewritten intermediate representation of the XML-QL query. Each of the nodes of the tagger graph are operators which perform processing on the results of the SQL query to add tags to generate the structured XML result.

The tagger graph is generated from the intermediate representation and, therefore, reflects the structure of the resultant XML document. The tagger runtime 240 walks the tagger graph applying the operators of each node to the inputs at that node to produce the structured XML document as a query result, guided by the structure of the tagger graph.

In addition, the SQL queries are generated from the intermediate representation such that the data from the query is ordered to additionally reflect the structure of the resultant XML document. Generating the SQL queries such that the results reflect the structure of the resultant XML document, by computing ordering inside the relational engine, allows the tagger runtime 240 to be a constant space tagger which prepares its results using a single pass over its inputs, buffering at most a single row from each input stream.

The tagger runtime 240 will be illustrated by an example. It should be noted that this example is different from the previous example above in order to more fully illustrate the various operators.

The exemplary database's schema is:
Employee=(workdept, eno, lastname)
Department=(deptno, deptname, size)

FIGS. 9a and 9b illustrate the Employee table and corresponding XML default view, respectively. FIGS. 10a and 10b illustrate the Department table and corresponding XML default view, respectively. The default view schemas are generated for both tables in the same manner as described above in conjunction with FIG. 3. By providing XML default views, a user can query seamlessly over relational data using an XML query language. This allows developers who would prefer to work solely in XML to do so, without regard to the fact that the underlying data is relational data.

The exemplary XML-QL query over the default views is illustrated in FIG. 11a. This exemplary query is designed to retrieve all of the departments, the employees associated with a department and to structure the result such that the employees of a department are nested within the department.

The WHERE part of the query defines variable bindings and the CONSTRUCT clause defines the structure of the result of the XML query, which is itself an XML document. In the WHERE part, the query binds variables $DEPTNO and $DEPTNAME to DEPTNO and DEPTNAME tag values (e.g. 1 and Spiffy Computer) for each row tag in the default XML view of the DEPARTMENT table (DefaultDepartment) and, hence, to DEPTNO and DEPTNAME column values in table DEPARTMENT. For each row in DEPARTMENT, the CONSTRUCT part of the query is run to produce a result. The root tag of each result is "dept" having an attribute called "name" which is set to the value of the variable $DEPTNAME which is bound to the DEPTNAME column in a row in DEPARTMENT. The tag "emplist" is nested with "dept" and its sub elements are generated using a nested XML-QL query whose output is defined by the CONSTRUCT clause of the nested query. The nested query selects employees in table EMPLOYEE, by querying the XML default view of the EMPLOYEE table whose attribute WORKDEPT matches variable $DEPTNO defined in the outer query. That is, the nested query selects employees who work in a department. For each employee in a department, the tags "employee" and "name" along with the value of variable $ENAME are generated and nested within tag "emplist". Closing matching tags are then produced. A sample output for this query is given by FIG. 11b.

As illustrated in FIG. 11b, the sample output lists four result departments: SPIFFY COMPUTER, PLANNING, INFORMATION CENTER and DEVELOPMENT CENTER. The first department has three employees, the second has a single employee, the third department has three employees and the fourth department has no employees.

The following discussion first describes the different tagger operators for building a tagger graph, followed by the tagger graph for the present example. Next, the preferred SQL query methods to appropriately structure the resultant data are discussed. Then, how the tagger runtime generates the elements for the resulting data, i.e. tags the resulting data, by calling and applying the operators when walking the tagger graph is described.

Tagger Operators

A tagger operator is either a scalar operator, an aggregate operator, or an input operator. These operators are the main runtime elements of the tagger graph and are the initial nodes reached during the walk of the graph.

Tagger Scalar—A tagger scalar operator tags results which correspond to constants, columns and scalar functions, excluding aggregate functions. A tagger scalar operator can have many inputs which can be any tagger operator. The scalar operator assembles results by requesting the next input on all its inputs and computing its result from these inputs. The first (leftmost) input is called the representative input. The first input is the parent of any other inputs attached to the operator. For example, if employees are aggregated under the departments to which they belong, the representative input is on department. If the representative input has no more data, the scalar operator signals, as output, that it neither has any more data.

Tagger Aggregate—A tagger aggregate operator has a single input and tags results which correspond to aggregate computations based upon aggregate functions. To compute its result, the operator draws individual results from its input until its input signals that it has no more data for the aggregate operator. The aggregate operator then renders and returns its result. An aggregate operator can render a result if no input exists in the input stream for its aggregate, or it can signal "no input" as its output depending upon its setting during tagger graph creation.

Tagger Input—A tagger input operator manages the delivery of data from the RDBMS to the tagger operators. It is the interface between the tagger runtime graph and the intermediate representation. The intermediate representation is used to generate SQL queries to extract data from RDBMSs. The tagger input operator buffers and manages database query results using tagger row streams (described below) embedded within the tagger input operators. There is a tagger input operator for each level in the XML result tree.

Each of the tagger operators comprise a tagger parse tree. A tagger parse tree is an element of a tagger operator that is used to compute a result column of the operator. A tagger parse tree can be a constant, a column of a lower tagger operator serving as input to this operator, or it can be a tagger function which can have a list of arguments including constants, columns and functions. To prepare an output row of a tagger operator, inputs for the operator are retrieved and each tagger parse tree is executed to compute its result. The result of each tagger parse tree is buffered into a row which is the tagger operator's result.

The tagger row streams, which are utilized by the tagger input operator, manage database results and determine the end of a group of tuples which is needed for aggregate computations. For example, if the tagger is aggregating the set of employees under each department, the row stream needs to determine if the end of a set of employees in a department has been reached. Two alternative methods are used to establish this. One is based upon outer union queries and type indicators produced as constants in an SQL query submitted to the RDBMS. Using outer union, a single SQL query is submitted to the database; its result contains all data required by the tagger runtime. The other alternative is based upon examining the parent keys of grouped objects to determine the end of a group. This second technique is called node strip. Using node strip, multiple queries are submitted to the database; there is one query for each level in the output tree.

Tagger Graph

Figure 11C:
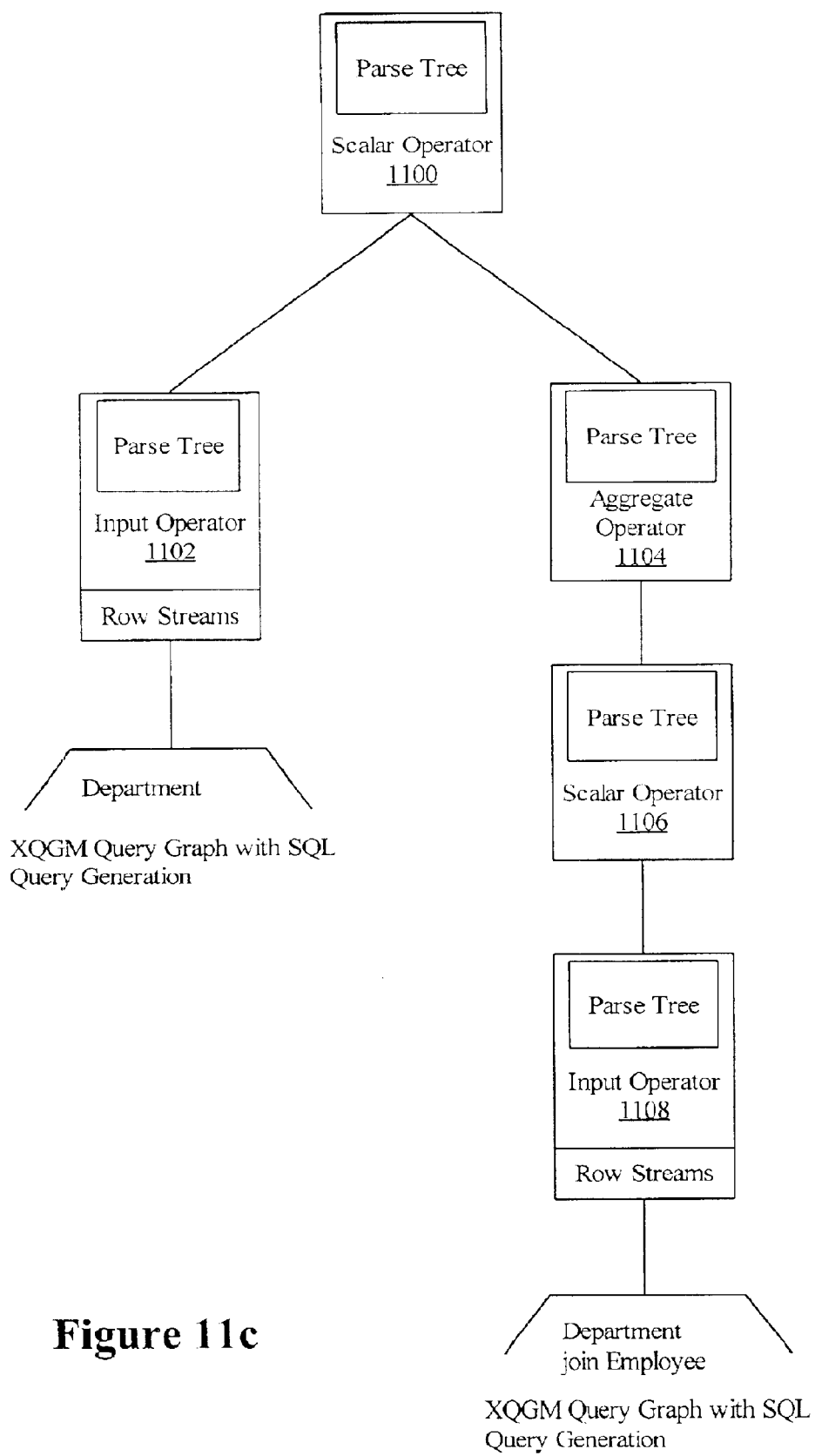
FIG. 11c illustrates the tagger graph for the exemplary XML-QL query over the default views.

The tagger graph for the present example is illustrated in FIG. 11c. As previously described, the tagger runtime walks the tagger graph, calling the operators to perform functions on the inputs in order to generate the output XML document.

The top scalar operator 1100 in the present example has two inputs. The first or representative input retrieves results for departments. The second input retrieves results for employees. Generally, for each input to tagger scalar operator 1100, starting from the left most input, the next results from the input are retrieved. The parse trees associated with the output of scalar operator 1100 are evaluated to produce its results based upon the results retrieved from the inputs. When top scalar operator 1100 makes the calls to retrieve results from its inputs, this algorithm is transitively applied to all lower operators when each lower operator, in turn, requests results from its inputs. Therefore, ultimately, tagger input operator 1102 retrieves the results of the SQL query corresponding to the department names. These are retrieved from input operator 1102 by scalar operator 1100. Tagger input operator 1108 retrieves the results of the SQL query corresponding to the employee names and these are retrieved from input operator 1108 by scalar operator 1106 which tags each individual result with <employee> and <name> tags. Aggregate operator 1104 retrieves individual tagged employees from scalar operator 1106 to build a list of employees associated with each department which are also retrieved by scalar operator 1100. Scalar operator 1100 creates tags for each department and nests the list of employees associated with each department to form the output XML document.

SQL Query Methods for Generating Structured Results

1. Outer Union

Since outer union row streams are the result of a single query issued to the relational DBMS to retrieve all data required for the XML query result, all tagger input operators share this row stream. Each branch of the union query has been adorned with extra constant valued columns which represent the type of result retrieved by that branch of the union. Sorting the result on the type columns guarantees that sub nodes of a node in the tree appear in the result after a node and that sub nodes are grouped together. For the purposes of aggregate computation, determining that the end of a group has been reached can be established strictly using the type indicators.

FIGS. 12a–12f illustrate the use of the outer union method for appropriately ordering the resultant data. FIG. 12a illustrates a SQL query generated to implement the outer union method of structuring SQL result data for the present example. This SQL query is generated from the intermediate representation of the XML-QL query of FIG. 11a. The portion of the query indicated by 1 performs a natural join of the Employee and Department tables, selects the deptno and lastname columns of the new table created by the natural join, and generates a new table. The top level select produces a table which has a deptno, a null, a lastname, and an indicator column. Note that the value in the indicator column is a constant value of 1. The null column is added in order to perform a union with the results of the query portion indicated by 2. The results of this portion of the query are illustrated in FIG. 12b.

The query portion indicated by 2 selects the deptno and deptname column from the Department table and generates a new table having deptno, deptname, null, and indicator columns. Note that the value in the indicator column for this portion is a constant value of 0. The results of this portion is illustrated in FIG. 12c.

The query performs the union of these two tables, illustrated in FIG. 12d, and orders the result of the union, as illustrated in FIG. 12e. The results of the union are first sorted according to the parent nodes. This groups all parent nodes and their child nodes together. The result is then sorted according to the indicator so that parent nodes appear before child nodes. In the present example, the results are sorted according to deptno values, which aren't retrieved from the query, and indicator column values. This groups all result rows belonging to the same department together, in the order of parent then child, i.e. department then employee.

Furthermore, by examining the value of the indicator column, the tagger runtime can determine for which tagger input operator a row is destined. The number of indicator columns is equal to the depth of the result XML tree less one. In the present example, the depth is two so there is a single indicator column. The final results from the query are illustrated in FIG. 12f.

Structuring the results in this manner inside the relational engine allows for the tagger runtime to be a constant space tagger which, at most, buffers a single row from the results of the SQL query, because all nodes and their descendants are grouped together in the results with parent nodes occurring before child nodes. In the present example, input operators 1102 and 1108 utilize a shared stream row manager to retrieve the first row of the results (FIG. 12f) into the buffer.

When upper most scalar operator 1100 requests results from its inputs, it starts with the leftmost input, i.e. left tagger input operator 1102. As left tagger input operator 1102 is called by upper most scalar operator 1100, it computes and returns a single row to upper most scalar operator 1100. Once it has received this input, upper most scalar operator requests results from the next input, moving from left to right, i.e. aggregate operator 1104. Aggregate operator 1104 then requests results from its input, which causes scalar operator 1106 to request the next row from right input operator 1108. The indicator of this row is 1. Right input operator 1108 retrieves the next row and returns it to scalar operator 1106, which in turn returns it to aggregate operator 1104. Because aggregate operator 1104 aggregates results, it continues to request rows in this manner until the indicator is no longer 1. When the next row no longer has an indicator of 1, right tagger input operator 1108 returns an end of stream signal, which is propagated up to aggregate operator 1104 in the same manner as a row of results. The end of stream signal causes aggregate operator 1104 to compute and return its result to upper most scalar operator 1100. In turn, upper most scalar operator 1100 once again requests results from its left-most input and this cycle continues until the rows returned from the SQL query are exhausted.

2. Node Strip

Alternatively, tagger node strip row streams are individual result streams belonging to each node in the result tree. Using the node strip approach results in the generation of the two queries in the present example; the first retrieves results belonging to left tagger input operator 1102 and the second retrieves results belonging to right tagger input operator 1108.

Results belonging to sub elements are sorted according to the keys of their parent elements and each references the keys of all its parent nodes in the tree in order to determine the end of a stream in aggregate computations. In the present example, results for nested employees are sorted so that they will be grouped by department number and sorted in the same order as department results (i.e., on the department number key DEPTNO). During tagger runtime, key values are used to determine the end of a group from the input stream; for example, if all employees within a department have been exhausted.

A set of SQL queries implementing this method are illustrated in FIG. 13a. The query corresponding to the left tagger input operator is designated as 1 and the query corresponding to the right tagger input operator is indicated by 2. The results of the query designated by 1 is illustrated in FIG. 13b and the results of the query designated by 2 are illustrated in FIG. 13c. Note that the results illustrated in FIG. 13c are the results corresponding to the child nodes and they are sorted by and contain a reference to the parent node, DEPTNO.

Structuring the results in this manner inside the relational engine allows for the tagger runtime to be a constant space tagger which, at most, buffers a single row from the results of each SQL query. When upper most scalar operator 1100 requests results from its inputs, it starts with the leftmost input, i.e. left tagger input operator 1102. As left tagger input operator 1102 is called by upper most scalar operator 1100, it computes and returns a single row to upper most scalar operator 1100. Once it has received this input, upper most scalar operator requests results from the next input, moving from left to right, i.e. aggregate operator 1104. Aggregate operator 1104 then requests results from its input, which causes scalar operator 1106 to request the next row from right input operator 1108. Right input operator 1108 retrieves the next row and returns it to scalar operator 1106, which in turn returns it to aggregate operator 1104. Because aggregate operator 1104 aggregates results, it continues to request rows in this manner.

For each result retrieved by right tagger input operator 1108, it compares the DEPTNO column for each row retrieved for employee sub elements to the DEPTNO value of the row retrieved by left input operator 1102 for the department elements. When the next row's DEPTNO value no longer matches that of the row retrieved by left input operator 1102, right tagger input operator 1108 returns an end of stream signal, which is propagated up to aggregate operator 1104 in the same manner as a row of results. The end of stream signal causes aggregate operator 1104 to compute and return its result to upper most scalar operator 1100. In turn, upper most scalar operator 1100 once again requests results from its left-most input and this cycle continues until the rows returned from the SQL query are exhausted.

Generating Output XML

The general algorithm for tagger runtime 240 is described by the following steps starting from the top tagger scalar operator 1100:

1. For each input to a tagger operator, starting from the left input to the right, retrieve the next result from the input.
2. Evaluate the parse trees associated with the output of the operator and produce its results based upon the results retrieved from the inputs.

While the algorithm is applied to the top scalar operator to retrieve the overall XML query result, the algorithm is transitively applied to all operators when each operator, in turn, requests results from its inputs.

The following describes how each operator, generally, implements the above algorithm:

Tagger Scalar Operator—If the representative tagger input operator has no more results, then signal the end of stream for this operator. Retrieve the next input row from each input stream starting from the left most input to the right most input. Evaluate the parse trees in the output of the operator producing the result.

Tagger Aggregate Operator—This operator has a single input. Depending upon the operator's setting, it can signal end of stream on an empty input stream, or it can render a result for the empty input stream. For each aggregate function in the operator's output, call initialize on the operator to prepare the operator for input. While there is input, evaluate the aggregate functions for each input row. When the end of stream is reach on the input (the end of a sub group call also signals an end of stream), terminate the execution of each aggregate function thereby rendering each aggregate function's result.

Tagger Input Operator—As previously described, outer union and node strip are two alternative execution models for tagger input operators. The following describes how the tagger input operators implement the above algorithm for each model:

Outer Union—If no row is present in the buffer, retrieve the next result from the database and place it in the buffer. If no more results remain in the input stream, propagate the end of stream signal as the output of the operator. Compare the type indicators in the retrieved row to the indicators of the tagger input operator. If the indicators match, then the end of stream hasn't been reached for this input stream and compute and return the buffered row and release the buffer. If the indicators don't match, signal an end of stream and maintain the row in the buffer.

Node Strip—If no row is present in the buffer, retrieve the next result from the database and place it in the buffer. If no more results remain in the input stream, propagate the end of stream signal as the output of this operator. This step is identical for both outer union and node strip approaches. Compare the key values for the parent key columns in both this row and the parent row. For example, employees are sub elements of their departments, and the value of the DEPTNO column in the row retrieved for employee sub elements is compared with the row retrieved from department elements. If the value of the key columns differ, signal an end of stream as output, otherwise, compute return the buffered row as output.

The tagger operators implement a number of functions when evaluating the parse trees to generate the XML output. The following are the set of functions performed by top scalar operator 1100 when it evaluates its parse tree:

cr8_elem ("dept",
  cr8_attr_list (cr8_attr ("name", LEFT_TIP.$DEPTNAME)),
  cr8_fragment_list (cr8_elem ("emplist",
    cr8_attr_list( ),
    cr8_fragment_list (AGG.$TAGGED_EMP_AGG)))

The top tagger scalar operator 1100 calls function cr8_elem (short for create_element) to tag incoming results from lower operators. The element "dept" is created along with its attribute list containing a single attribute. The call to "cr8_attr" creates attribute "name" and sets its value to the variable $DEPTNAME of the left tagger input operator 1102 over DEPARTMENT. The call to "cr8_attr_list" wraps the attribute in a list of attributes. The call to "cr8_fragment_list" builds nested subelements of "dept". A single sub element "emplist" is created. It has no attributes and its contents are derived from the result of the tagger aggregate operator 1104.

The following are the set of functions performed by tagger aggregate operator 1104 when it evaluates its parse tree:

cr8_fragments (SCALAR.$TAGGED_EMP_SCALAR)
  as $TAGGED_EMP_AGG

The tagger aggregate operator 1104 calls function "cr8_fragments" (short for create_fragments) to build the list of employees associated with each department. Individual tagged employee results are retrieved from the lower scalar operator 1106.

The following are the set of functions performed by lower scalar operator 1106 when it evaluates its parse tree:

cr8_elem ("employee", cr8_attr_list( ),
  cr8_fragment_list ("name",
    cr8_attr_list( ),
    cr8_fragment_list (RIGHT_TIP.$ENAME)))
  as $TAGGED_EMP_SCALAR The lower scalar operator 1106 creates an "employee" tag using the "cr8_elem" function. The element has no attributes and has a sub element drawn from the right tagger input operator 1108 and bound to the variable $ENAME.

Both tagger input operators 1102 and 1108 retrieve their inputs from the database indirectly through a tagger row streams manager embedded within the tagger input operator as previously described; utilizing either the outer union or node strip models.

In addition, each tagger operator implements a "next" method which produces the following result row in its stream of results from the above described functions. The "next" method returns an end-of-stream signal when all results in the stream have been exhausted or the end of a group has been reached.

Also, to request results from its input, each operator implements a "getObject(int)" method which returns the object in the ith column of a lower operator's result. The desired column is passed as parameter to the "getObject" method.

Figure 14:
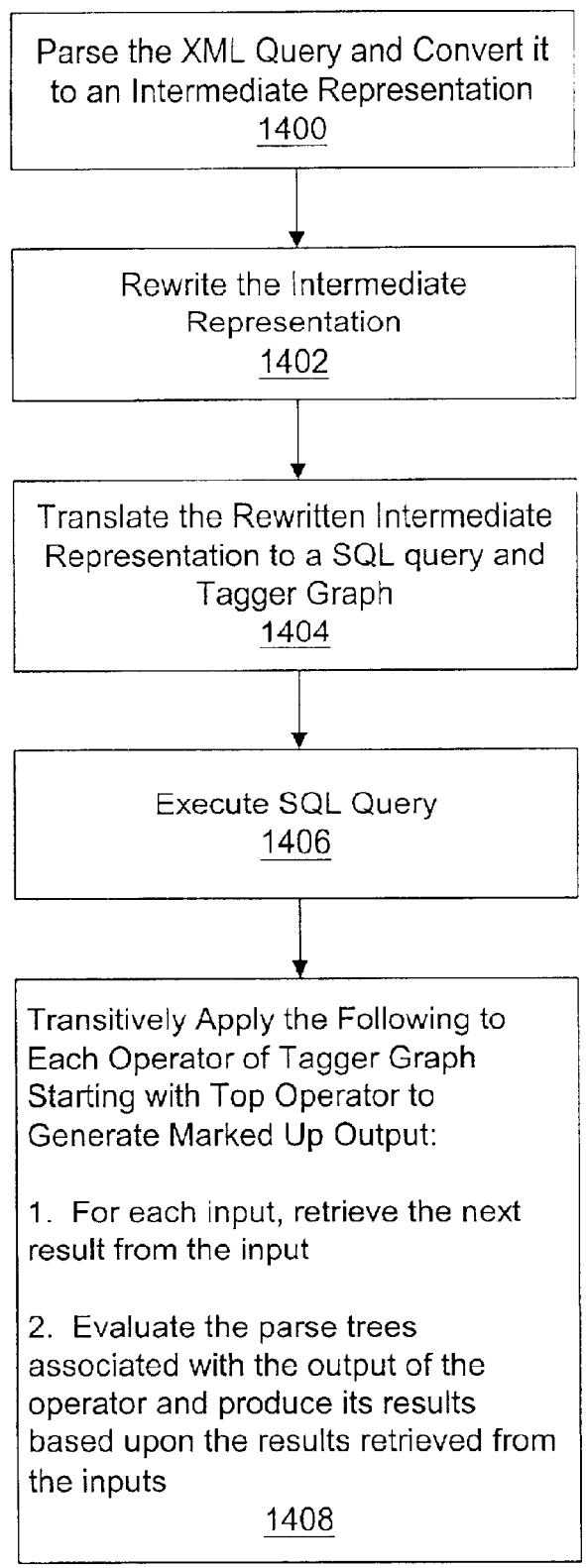
FIG. 14 is a flowchart that illustrates the method steps performed by the preferred embodiment of the present invention.

FIG. 14 is a flowchart that illustrates the method steps performed by the preferred embodiment of the present invention.

Block 1400 represents the parsing of an XML query. Schema mapper 200 establishes a default XML schema (the Default View) for the data stored in RDBMS 102. Each table is mapped to a virtual XML document over which XML queries are issued. Parser 210 converts the XML query to a language-neutral intermediate representation, which is a sequence of operations that describe how the marked up output of the XML query is derived from the underlying relational tables.

Block 1402 represents the rewriting of the intermediate representation to an equivalent form that may be easily translated into an SQL query. More specifically, operations to construct and group XML elements 740 are reordered to appear at the top in the rewritten intermediate representation.

Block 1404 represents the translation of the intermediate representation to: (1) SQL query 800 over the underlying relational table; and (2) a tagger graph for tagger 240. Operations that select and relate data 730 are translated into SQL query 800, which establishes the selection criteria and relationships among data. Operations that construct and group XML elements 740 are translated into a tagger graph, which describe how to generate the marked up output from the results of SQL query 800.

Block 1406 represents the execution of SQL query 800. The results of SQL query 800 are fed into tagger 240, which follows the tagger graph to generate the marked up output.

Block 1408 represents the algorithm of tagger 240 to follow the tagger graph to generate and output the result XML document. For each input, the next result is retrieved from the input. The parse trees associated with the output of the operator are evaluated and produce its results are produced based upon the results retrieved from the inputs. This algorithm is applied transitively to each operator of the tagger graph when each operator, in turn, requests results from its inputs.

In the foregoing description of the preferred embodiment, reference is made to the accompanying drawings that form a part hereof, and in which is shown by way of illustration a specific embodiment in which the invention may be practiced. It is to be understood that other embodiments may be utilized and that structural and functional changes or other modifications and variations may be made without departing from the scope of the present invention. For example, any type of computer, such as a mainframe, minicomputer, or personal computer, could be used to implement the present invention. In addition, the present invention is not limited by specific document formats or document query languages. For example, the present invention could also be used with HTML or SGML. The description of the preferred embodiment has been presented for the purposes of illustration and description, and is not intended to be exhaustive or to limit the invention to the precise form disclosed. It is intended that the scope of the invention be limited not by this detailed description but rather by the claims appended hereto.

We claim:

1. A computer implemented method of tagging results of an XML query over a relational database, said method comprising:
   generating a tagger tree graph from said XML query, each node of said tagger tree graph comprising a tagger operator, each tagger operator having a tagger parse tree associated therewith;
   calling each tagger operator in accordance with a structure of said tagger tree graph, and evaluating said tagger parse trees associated with each called tagger operator to tag results of said XML query over said relational database.

2. A computer implemented method of tagging results of an XML query over a relational database, as per claim 1, wherein said tagger node graph has a top-most tagger operator and a plurality of lower-most tagger operators, said calling and evaluating steps further comprising:
   a. starting with said top-most tagger operator, each tagger operator implementing a method to request results from inputs to said tagger operator, said method causing lower level tagger operators connected to said inputs to be called;
   b. starting with said lower-most tagger operators, each called tagger operator returning intermediate tagged results to a higher-level connected tagger operator upon evaluating said associated parse tree;
   performing steps a and b until an end of said results of said XML query is reached, and said top-most tagger operator producing tagged output XML of said results of said XML query.

3. A computer implemented method of tagging results of an XML query over a relational database, as per claim 1, wherein said tagger operators comprise any of a tagger input operator, a tagger scalar operator or a tagger aggregate operator.

4. A computer implemented method of tagging results of an XML query over a relational database, as per claim 1, wherein said tagger tree graph includes a tagger operator for each level in a result XML tree of said XML query.

5. A computer implemented method of tagging results of an XML query over a relational database, as per claim 4, wherein said tagger input operators execute in a sorted outer union mode.

6. A computer implemented method of tagging results of an XML query over a relational database, as per claim 5, wherein said tagger input operators comprise a shared tagger row stream.

7. A computer implemented method of tagging results of an XML query over a relational database, as per claim 4, wherein said tagger input operators execute in a node strip mode.

8. A computer implemented method of tagging results of an XML query over a relational database, as per claim 7, wherein each of said tagger operators comprises a tagger row stream.

9. A computer implemented method of tagging results of an XML query over a relational database, as per claim 1, wherein each tagger operator performs any of a cr8_elem, a cr8_attr, a cr8_attr_list, a cr8_fragments or a cr8_fragment_list function.

10. A computer implemented method of tagging results of an XML query over a relational database, as per claim 1, wherein each tagger operator implements a next method to produce a result row.

11. A computer implemented method of tagging results of an XML query over a relational database, as per claim 1, said method further comprising:
   parsing said XML query;
   transforming said parsed XML query into a language-neutral intermediate representation;
   rewriting said language-neutral intermediate representation into an equivalent form easily translated into an SQL query;
   translating said equivalent form into one or more SQL queries over said relational database, and
   executing said one or more SQL queries to produce said results of said XML query over said relational database.

12. A computer implemented method of tagging results of an XML query over a relational database, as per claim 11, wherein said tagger tree graph is generated from said equivalent form.

13. A computer implemented method of tagging results of an XML query over a relational database, as per claim 11, wherein said tagger tree graph includes a tagger operator for each node in a result XML tree of said XML query.

14. A computer implemented method of tagging results of an XML query over a relational database, as per claim 13, wherein said tagger input operators execute in a sorted outer union mode and said translating step produces a single SQL query to produce a single sorted outer union relational database result.

15. A computer implemented method of tagging results of an XML query over a relational database, as per claim 14, wherein said tagger input operators comprise a shared tagger row stream.

16. A computer implemented method of tagging results of an XML query over a relational database, as per claim 13, wherein said tagger input operators execute in a node strip mode and said translating step produces a set of SQL queries to produce a set of node strip relational database results.

17. A computer implemented method of tagging results of an XML query over a relational database, as per claim 16, wherein each of said tagger operators comprises a tagger row stream.

18. A computer implemented method of tagging results of an XML query over a relational database, as per claim 11, wherein said tagger operators comprise any of a tagger input operator, a tagger scalar operator or a tagger aggregate operator.

19. A computer implemented method of tagging results of an XML query over a relational database, as per claim 11, wherein a number of relational database tables of said relational database are mapped to a number of virtual XML documents and said XML queries are issued over said virtual XML documents.

20. A computer implemented method of tagging results of an XML query over a relational database, as per claim 1, wherein said method operates over a distributed computing network.

21. A computer implemented method of tagging results of an XML query over a relational database, as per claim 20, wherein said method operates over the Internet.

22. A computer-based system for tagging results of an XML query over a relational database, said system comprising:
- a tagger runtime component;
- means for generating a tagger tree graph from said XML query, each node of said tagger tree graph comprising a tagger operator;
- means for generating a tagger parse tree associated with each tagger operator, and wherein
- said tagger runtime component calls each tagger operator in accordance with a structure of said tagger tree graph and evaluates said tagger parse trees associated with each called tagger operator to tag results of said XML query over said relational database.

23. A computer-based system for tagging results of an XML query over a relational database, as per claim 22, wherein said tagger node graph has a top-most tagger operator and a plurality of lower-most tagger operators, and to perform said calling and evaluating, said tagger runtime component further:
 a. starting with said top-most tagger operator, causing each tagger operator to implement a method to request results from inputs to said tagger operator, said method causing lower-level tagger operators connected to said inputs to be called;
 b. starting with said lower-most tagger operators, causing each called tagger operator to return intermediate tagged results to a higher-level connected tagger operator upon evaluating said associated parse tree;
 performing steps a and b until an end of said results of said XML query is reached, and upon reaching an end of said results of said XML query, causing said top-most tagger operator to produce a tagged output XML document of said results of said XML query.

24. A computer-based system for tagging results of an XML query over a relational database, as per claim 22, wherein said tagger operators comprise any of a tagger input operator, a tagger scalar operator or a tagger aggregate operator.

25. A computer-based system for tagging results of an XML query over a relational database, as per claim 22, wherein said tagger graph includes a tagger input operator for each node in a result XML tree of said XML query.

26. A computer-based system for tagging results of an XML query over a relational database, as per claim 25, wherein said tagger input operators execute in a sorted outer union mode.

27. A computer-based system for tagging results of an XML query over a relational database, as per claim 26, wherein said tagger input operators comprise a shared tagger row stream.

28. A computer-based system for tagging results of an XML query over a relational database, as per claim 25, wherein said tagger input operators execute in a node strip mode.

29. A computer-based system for tagging results of an XML query over a relational database, as per claim 28, wherein each of said tagger operators comprises a tagger row stream.

30. A computer-based system for tagging results of an XML query over a relational database, as per claim 22, wherein each tagger operator performs any of a cr8_elem, a cr8_attr, a cr8_attr_list, a cr8_fragments or a cr8_fragment_list function.

31. A computer-based system for tagging results of an XML query over a relational database, as per claim 22, wherein each tagger operator implements a next method to produce a result row.

32. A computer-based system for tagging results of an XML query over a relational database, as per claim 22, said system further comprising:
- a parser, said parser parsing said XML query and transforming said parsed XML query into a language-neutral intermediate representation;
- a rewrite engine, said rewrite engine rewriting said language-neutral intermediate representation into an equivalent form easily translated into an SQL query;
- a translator, said translator translating said equivalent form into one or more SQL queries over said relational database, and
- an RDBMS, said RDBMS executing said one or more SQL queries to produce said results of said XML query over said relational database.

33. A computer-based system for tagging results of an XML query over a relational database, as per claim 32, wherein said tagger graph is generated from said equivalent form.

34. A computer-based system for tagging results of an XML query over a relational database, as per claim 32, wherein said tagger graph includes a tagger input operator for each node in a result XML tree of said XML query.

35. A computer-based system for tagging results of an XML query over a relational database, as per claim 34, wherein said tagger input operators execute in a sorted outer union mode and said translator produces a single SQL query to produce a single sorted outer union relational database result.

36. A computer-based system for tagging results of an XML query over a relational database, as per claim 35, wherein said tagger input operators comprise a shared tagger row stream.

37. A computer-based system for tagging results of an XML query over a relational database, as per claim 34, wherein said tagger input operators execute in a node strip mode and said translator produces a set of SQL queries to produce a set of node strip relational database results.

38. A computer-based system for tagging results of an XML query over a relational database, as per claim 37, wherein each of said tagger operators comprises a tagger row stream.

39. A computer-based system for tagging results of an XML query over a relational database, as per claim 32, wherein said tagger operators comprise any of a tagger input operator, a tagger scalar operator or a tagger aggregate operator.

40. A computer-based system for tagging results of an XML query over a relational database, as per claim 32, said system further comprising:
- a schema mapper, said schema mapper mapping a number of relational database tables of said relational database to a number of virtual XML documents, and an XML-QL engine, said XML-QL engine issuing said XML queries over said virtual XML documents.

41. A computer-based system for tagging results of an XML query over a relational database, as per claim 22, wherein said system operates over a distributed computing network.

42. A computer-based system for tagging results of an XML query over a relational database, as per claim 41, wherein said system operates over the Internet.

43. A computer-based system for tagging results of an XML query over a relational database, as per claim 22, wherein said tagger runtime operates outside an RDBMS.

44. A computer program product comprising a machine-readable medium including computer readable program code therein for tagging results of an XML query over a relational database comprising:

computer readable program code generating a tagger tree graph from said XML query, each node of said tagger tree graph comprising a tagger operator, each tagger operator having a tagger parse tree associated therewith;

computer readable program code calling each tagger operator in accordance with a structure of said tagger tree graph, and computer readable program code evaluating said tagger parse trees associated with each called tagger operator to tag results of said XML query over said relational database.

45. A computer program product comprising a machine-readable medium including computer readable program code therein for tagging results of an XML query over a relational database as per claim 44, wherein said generated tagger node graph has a topmost tagger operator and a plurality of lower-most tagger operators, said calling and evaluating computer readable program code further comprising:

computer readable program code for performing:

a. starting with said top-most tagger operator, each tagger operator requesting results from inputs to said tagger operator, said request causing lower-level tagger operators connected to said inputs to be called;

b. starting with said lower-most tagger operators, each called tagger operator returning intermediate tagged results to a higher-level connected tagger operator upon evaluating said associated parse tree;

performing steps a and b until an end of said results of said XML query is reached, and said top-most tagger operator producing tagged output XML of said results of said XML query.

\* \* \* \* \*